(12) United States Patent
Mindel et al.

(10) Patent No.: US 10,427,564 B2
(45) Date of Patent: Oct. 1, 2019

(54) DIRECTED IMPACT ABSORPTION SYSTEMS AND METHODS

(71) Applicant: MOBIUS PROTECTION SYSTEMS LTD., Holon (IL)

(72) Inventors: Shy Mindel, Holon (IL); Anan Hasan, Julis (IL)

(73) Assignee: Mobius Protection Systems Ltd., Holon (IL)

( * ) Notice: Subject to any disclaimer, the term of this patent is extended or adjusted under 35 U.S.C. 154(b) by 717 days.

(21) Appl. No.: 14/849,784

(22) Filed: Sep. 10, 2015

(65) Prior Publication Data

US 2016/0068085 A1 Mar. 10, 2016

Related U.S. Application Data (60) Provisional application No. 62/048,320, filed on Sep. 10, 2014.

(51) Int. Cl.
*B60N 2/427* (2006.01)

(52) U.S. Cl.
CPC ......... *B60N 2/427* (2013.01); *B60N 2/42709* (2013.01)

(58) Field of Classification Search
CPC .......................... B60N 2/427; B60N 2/42709
USPC ..................................... 297/216.17
See application file for complete search history.

(56) References Cited

U.S. PATENT DOCUMENTS

| 4,128,217 A * | 12/1978 | Mazelsky | B64D 25/04 297/216.16 |
| 4,423,848 A * | 1/1984 | Mazelsky | B64D 25/04 297/216.16 |
| 7,293,830 B2 * | 11/2007 | Marotta | B60N 2/503 297/216.17 X |
| 8,393,667 B2 * | 3/2013 | Hashimoto | B60N 2/0276 297/216.14 |

FOREIGN PATENT DOCUMENTS

WO    WO 2013/046200    4/2013

* cited by examiner

*Primary Examiner* — Anthony D Barfield
(74) *Attorney, Agent, or Firm* — Pearl Cohen Zedek; Latzer Baratz LLP (57) ABSTRACT

Impact absorption devices and methods for a vehicle's seat are provided. Devices comprise vertical support(s), energy absorbing element(s) hingedly connected to the seat and hingedly connected to the vertical support; and at least four rods hingedly connected to the seat and hingedly connected to the vertical support. The rods are positioned to geometrically guide a relative motion of the seat with respect to the vertical support upon impact, and to direct the impact energy absorption by the energy absorbing element(s). The rods may be configured according to prevailing spatial relations and required energy absorption with respect to expected intensities and directions of impacts. The devices may be configured with any energy absorption element(s), may be augmented by vibration damping or implemented using electromagnetic dampers.

15 Claims, 9 Drawing Sheets

DIRECTED IMPACT ABSORPTION SYSTEMS AND METHODS

CROSS-REFERENCE TO RELATED APPLICATIONS

This application claims benefit of U.S. Patent Application No. 62/048,320, filed Sep. 10, 2014, which is hereby incorporated by reference.

BACKGROUND OF THE INVENTION

1. Technical Field

The present invention relates to the field of safety devices, and more particularly, to energy absorbing, impact handling systems.

2. Discussion of Related Art

Impact energy is often harming and destructive. A special case is a seat system in a vehicle, onto which impacts may prove life threatening.

SUMMARY OF THE INVENTION

One aspect of the present invention provides an impact absorption device for a vehicle's seat, comprising: a vertical support; at least one energy absorbing element, configured to absorb impact energy, hingedly connected to the seat and hingedly connected to the vertical support; and at least four rods hingedly connected to the seat and hingedly connected to the vertical support, the rods positioned to geometrically guide a relative motion of the seat with respect to the vertical support upon impact, and to direct the impact energy absorption by the at least one energy absorbing element.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Prior to the detailed description being set forth, it may be helpful to set forth definitions of certain terms that will be used hereinafter. The directional terms (e.g., vertical, horizontal, front, rear etc.) as used in this application in a non-limiting exemplary manner and refer to a range of actual directions around the specified direction. For example, the term "vertical" is to be understood any substantially vertical direction, varying e.g., ±20° from the geometric vertical. Moreover, impact and movement directions are shown for illustrative purposes, while actual directions may be defined by specific device configurations devised according to the disclosed principles. All such configurations are considered part of the present disclosure. This understanding applies both to directions of impact, of forces, and of movement. While the seat's movement is initially opposite to the direction of the impact force, its later motion is modified and determined by the disclosed mechanical assemblies.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Impact absorption devices and methods for a vehicle's seat are provided. Devices comprise vertical support(s), energy absorbing element(s) hingedly connected to the seat and hingedly connected to the vertical support; and at least four rods hingedly connected to the seat and hingedly connected to the vertical support. The rods are positioned to geometrically guide a relative motion of the seat with respect to the vertical support upon impact, and to direct the impact energy absorption by the energy absorbing element(s). The rods may be configured according to prevailing spatial relations and required energy absorption with respect to expected intensities and directions of impacts. The devices may be configured with any energy absorption element(s), may be augmented by vibration damping or implemented using electromagnetic dampers.

Figure 1:
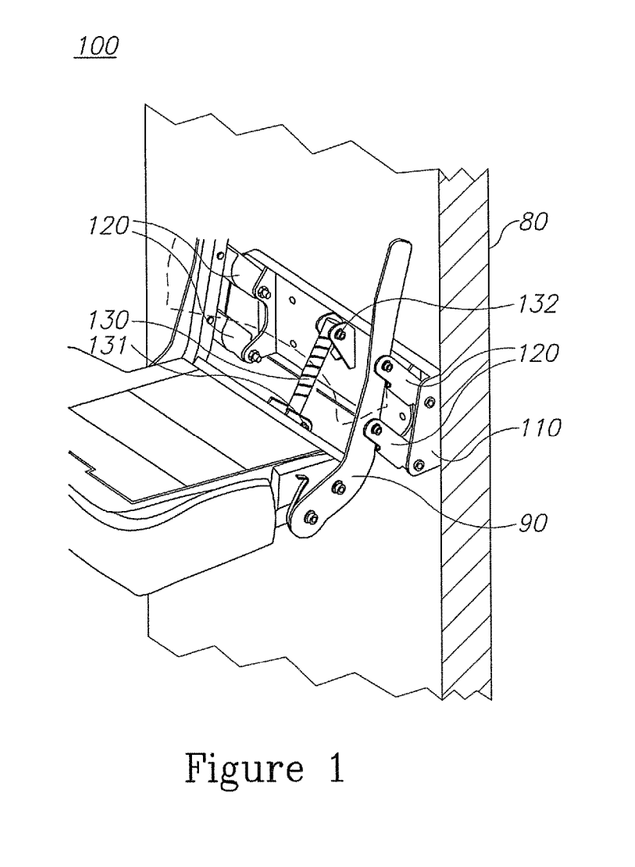
FIG. 1 is a high level schematic illustration of an impact absorption device for a vehicle's seat, according to some embodiments of the invention.

FIG. 1 is a high level schematic illustration of an impact absorption device 100 for a vehicle's seat 90, according to some embodiments of the invention.

Impact absorption device 100 comprises one or more vertical support(s) 110, which may be connected to a vehicle's wall 80 behind seat 90; at least one energy absorbing element 130 hingedly connected to seat 90 and hingedly connected to vertical support 110 and at least four rods 120 hingedly connected to seat 90 and hingedly connected to vertical support 110. Rods 120 are positioned to geometrically guide a relative motion of seat 90 with respect to vertical support 110 upon impact, and to direct the impact energy absorption by energy absorbing element(s) 130. Energy absorbing element(s) 130 may be implemented by various elements configured to absorb impact energy, such as plastically deformable members (in elongation and/or in compression), electromagnetic dampers and so forth.

In certain embodiments, energy absorbing element(s) 130 may be configured to absorb impact energy at least by plastic elongation and/or compression and may, for example comprise a spirally wound element having anchoring connections at either side and characterized by a preconfigured elongation-force curve (and/or a preconfigured force-deflection curve). Element(s) 130 may be designed to absorb the impact energy as plastic deformation energy during elongation and/or compression according to appropriate curves which are preconfigured according to the geometry of the absorption situation (seat and support positions, expected impacts, specified allowed relative motions etc.). Spirally wound energy absorbing element(s) 130 may be produced by introducing a cut of specified width into a manufactured tubular element, the cut determining the spiral form while the tubular element parameters such as material, dimensions and thickness define the force-defelction curve. The cut may be introduced by actual cutting or by manufacturing methods that produce the cut as part of the tubular element structure such as molding. Energy absorbing element(s) 130 may be produced by any of casting, injecting, eroding, molding, wire twining, machining, cutting, forming, bending and any combination thereof. The tubular element may have variable diameter and may exhibit two uncut ends as attachment points to seat 90 and support 110. Configurations of energy absorbing element(s) 130 described in WIPO Patent Application Publication No. 2013/046200 are included herein by reference, and the document is incorporated herein by reference in its entirety.

In certain embodiments, energy absorbing element(s) 130 may comprise any of the following: an elongated spiral, a crushable column, a rolling torus, an inversion tube, a cutting shock absorber, a slitting shock absorber, a tube-and-die absorber, a rolling absorber, a flattening-tube absorber, a strap bender absorber, a rod bender absorber, a wire bender absorber, a wire-through-platen absorber, a deformable link absorber, an elongating a tube/strap/cable absorber, a tube flaring, a housed coiled cable absorber, a bar-through-die absorber, a hydraulic absorber, a pneumatic absorber, an electric, a magnetic or an electro-magnetic energy absorber and combinations thereof.

In certain embodiments, rods 120 may be parallel and equal in length to form a parallelogram with the seat's back and the vertical support, the parallelogram having variable angles upon the relative motion of seat 90 and support 110 upon absorbing various impacts. Rods 120 may be configured to transmit the forces of the impact to energy absorbing element(s) 130 in a way that optimizes energy absorption by element(s) 130 and reduces the forces applied onto seat 90 and/or a passenger seated thereupon. In certain embodiments, rods 120 may be configured to transmit residual impact forces to the passenger in a way that is most anatomically tolerable, e.g., impact forces may be diverted in directions that are more readily absorbed by the passenger's skeletal system.

Figure 2A:
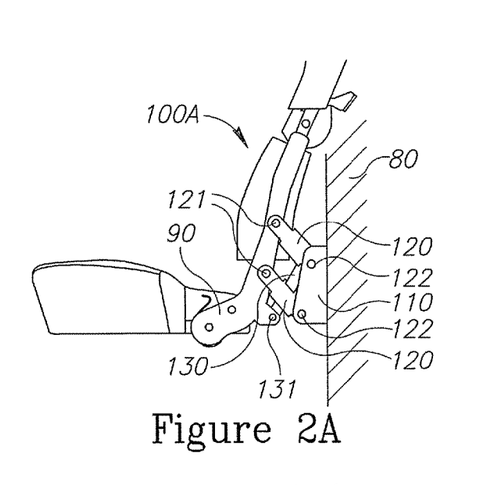
FIGS. 2A and 2B are high level schematic illustrations of the device before and after impact, according to some embodiments of the invention.
Figure 2B:
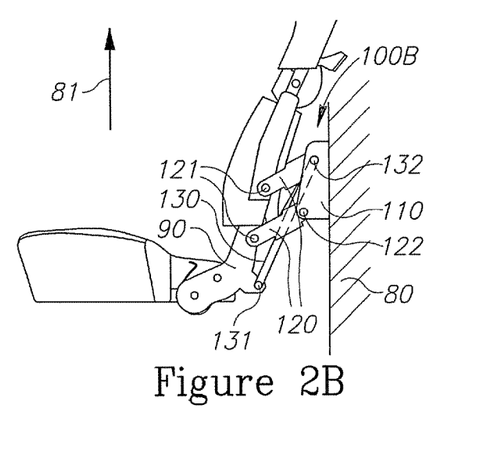

FIGS. 2A and 2B are high level schematic illustrations of device 100 before and after impact 81 (states 110A, 110B, respectively, arrow 81 denotes the direction of the force applied to seat 90 as result of the impact, in the illustrated example a vertical impact (the seat's movement is basically opposite to the force direction), according to some embodiments of the invention. FIGS. 2A, 2B further illustrate pivots 121, 122 for the hinged connection of rods 120 to seat 90 and support 110, respectively and pivots 131, 132 for the hinged connection of energy absorbing element 130 to seat 90 and support 110, respectively. The rotation of rods 120 with respect to pivots 121, 122 lowers seat 90 with respect to support 110 upon substantially vertical impact 81 and simultaneously direct the plastic deformation of energy absorbing element 130 upon this motion (compare the relative positions of pivots 131, 132 in the device before and after impact 100A, 100B, respectively).

Figure 3A:
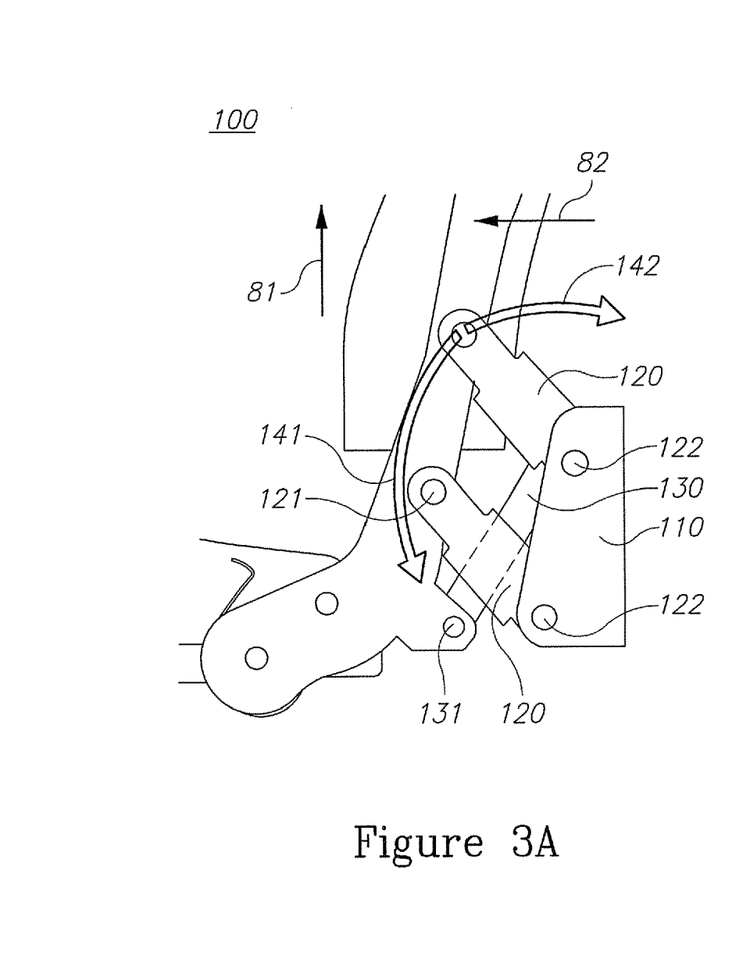
FIG. 3A is a high level schematic illustration of the device under vertical and rear impacts, according to some embodiments of the invention.

FIG. 3A is a high level schematic illustration of device 100 under vertical and rear impacts 81, 82, respectively, according to some embodiments of the invention. It is noted that the direction "rear" refers to the position of seat 90 and not necessarily to the vehicle (e.g., seat 90 may be positioned opposite or perpendicular to the vehicle). Arrows 81, 82 illustrate schematically the direction of forces applied onto seat 90 as result of the respective impacts, forces which are then absorbed by elements 130 under guidance of rods 120. It is noted that device 100 may be designed, according to the disclosed principles, to handle any other impact forces, e.g., forces opposite or at an angle to the illustrated forces, or even forces having a perpendicular component (going into or out of the page), the latter confronted either by adding perpendicular components or by designing energy absorbing element(s) 130 and rods 120 to respond to respective forces, e.g., to deform in the respective direction. Rods 120 may be positioned to enable the relative motion of seat 90 upon impact and the operation of energy absorbing element(s) 130 for both vertical and rear impacts 81, 82, respectively (as well as for impact components that are perpendicular to impacts 81, 82, if such exist or are designed for). In certain embodiments, rods 120 may be positioned to enable the relative motion of seat 90 upon impact and the operation of energy absorbing element(s) 130 in three directions, by adding rods 120 and elements 130 that guide motion and absorb energy, respectively, resulting from rear impacts to seat 90 (which may be side impacts to the vehicle is seat 90 is positioned transversely). Possibly, rods 120 may be positioned to enable the relative motion of seat 90 upon impact and the operation of energy absorbing element(s) 130 for any specified impact direction for example, vertical impact, rear impact, front impact and any specified combination of impact directions. Motion parameters may be different for different motions, e.g., in the non-limiting illustrated example, vertical motion 141 (due to vertical impact 81) may have a relatively small horizontal component and a relatively large vertical component, while backward motion 142 (due to front impact 82) may have a relatively large horizontal component and a relatively small vertical component, all depending on specified requirements from device 100 such as expected impacts, available space around seat 90 and other specifications. Specific motion parameters may be adjusted by configuring the rod parameters such as lengths, angles and relative positions, which may be possibly modified or adjusted even during motion and which may differ from rod to rod. For example, upper rods 120 may be shorter than lower rods 120 to reduce the motion of the upper part of seat 90 and thus contribute to controlling the body posture of a person sitting in seat 90 during impact and the performance of the motion guided by rods 120. For example, an angle of the person's back may be control to minimize injury risk.

Figure 3B:
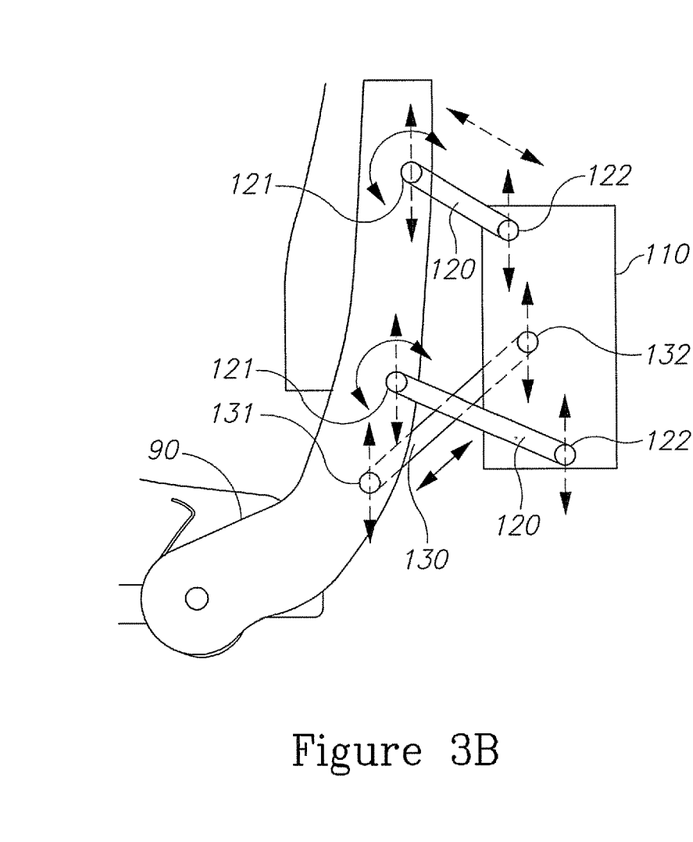
FIG. 3B is a high level schematic illustration of configuration possibilities of the device, according to some embodiments of the invention.

FIG. 3B is a high level schematic illustration of configuration possibilities of the device, according to some embodiments of the invention. Any of pivots 121, 122, 131, 132 may be re-positioned according to specified expected magnitudes and directions of the impacts to optimize the guided relative motion of seat 90 with respect to vertical support 110 upon impact, and to direct the impact energy absorption by energy absorbing element(s) 130. The broken arrows exemplify some of the configuration possibilities while the solid arrows represent the guided relative motion of seat 90 with respect to vertical support 110 upon impact. The geometrical arrangement of rods 120 determines the allowed movement of seat 90. Furthermore, the positioning of energy absorbing element(s) 130 may be used to determine its mode of operation upon given impacts (e.g., elongation or compression upon vertical impact may be determined by the relative heights of pivots 131, 132) and hence may be adapted to expected impact specifications.

Figure 4A:
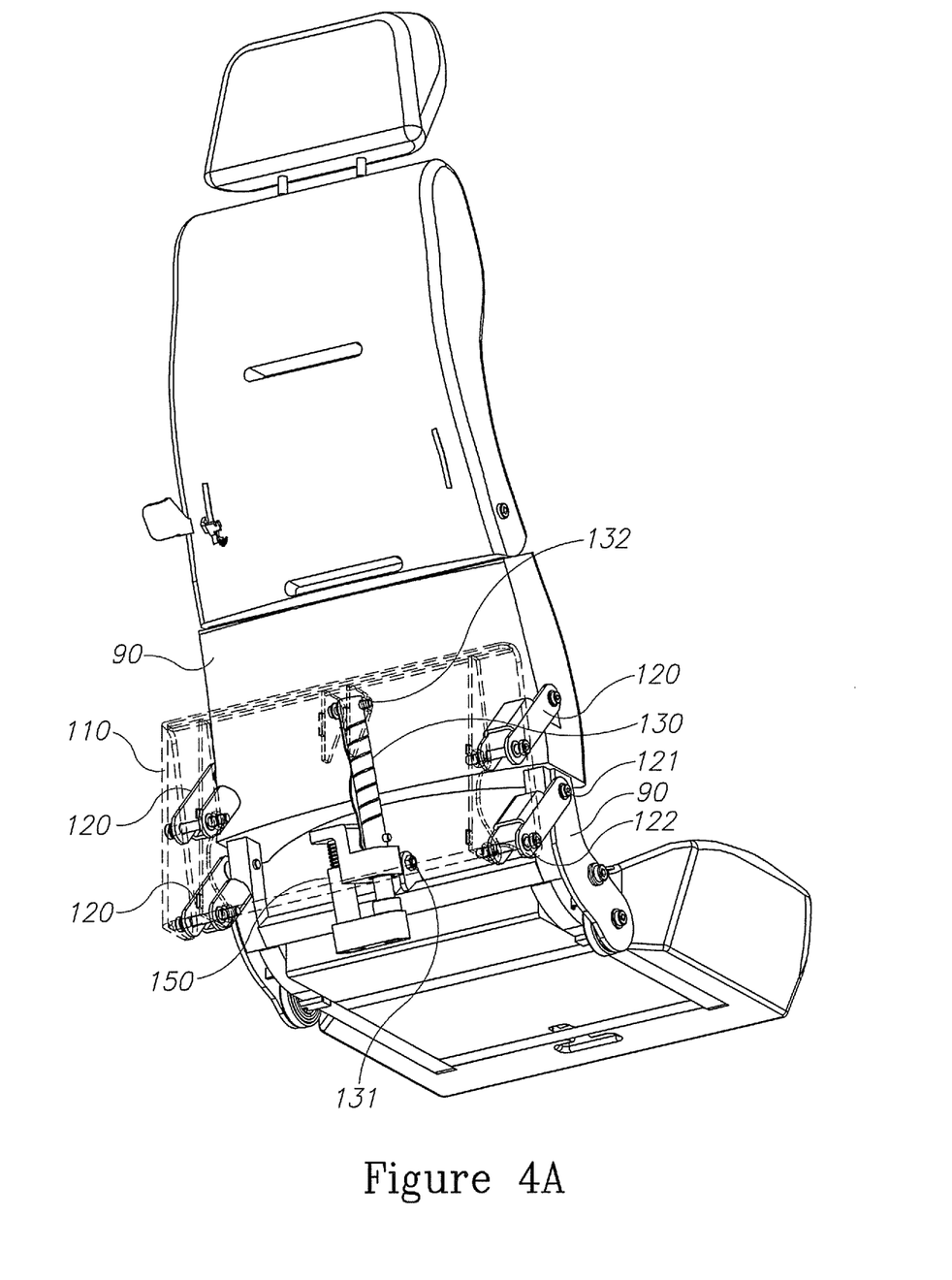
FIG. 4A is a high level schematic illustration of the device with an additional member for vibration damping, according to some embodiments of the invention.

FIG. 4A is a high level schematic illustration of device 100 with an additional member 150 for vibration damping, according to some embodiments of the invention. Member 150 may comprise a mechanical damper which is connected to energy absorbing element 130 in series (in FIG. 4A the connection is based on a linear motion bearing while in FIG. 4B it is based on a hinged connection). In the illustration, member 150 is serially connected to element 130, in a connection based on a linear motion bearing. In certain embodiments, an electromechanical system may be used in place of elements 130, 150 combining energy absorption with vibration damping.

In certain embodiments, an impact handling system is provided, which comprises a dynamic part 90 mounted on a static part 110 via at least four rods 120 and at least one energy absorbing element 130. Rods 120 and element(s) 130 are positioned and configured to guide, upon specified impacts, a motion of dynamic part 90 and the energy absorption by energy absorbing element(s). Dynamic part 90 may be illustrated seat 90 or other vehicle elements installed within a vehicle, or any other elements within a surrounding frame which may move upon impact. Static part 110 may be a vehicle part such as a vehicle wall, floor or roof, illustrated vertical support 110 or any static part of the frame in the latter case. The specified impacts may comprise any of vertical, rear and front impacts. Any of the disclosed embodiments may be implemented in the impact handling system.

In certain embodiments, energy absorbing element(s) 130 may be compressible to damp vibrations of seat 90. If element 130 is a spirally cut tube, cut width may be configured to provide a specified contraction range. In certain embodiments, device 100 may further comprise vibration damper 150 (FIG. 4A) connected in series (e.g., at pivots 151, 152) to energy absorbing element 130 and configured to damp seat vibrations. In certain embodiments, vibration absorbing member 150 may be configured to respond rigidly to the impact so as to enable complete transfer of the impact's energy to energy absorbing element(s) 130. For example, vibration absorbing member 150 may comprise a velocity dependent piston which locks above a specified velocity, e.g., 5 m/sec. In certain embodiments, vibration absorbing member 150 may be mechanically or otherwise locked at an end of its stroke. In certain embodiments, element 130 and member 150 may be interconnected at a same axis 132, 151) or be interconnected by a mechanical mechanism, e.g., bars, linkages etc. The serial connection of pivots 131, 132, 151, 152 may be modified according to specified motion and energy absorption requirement. In certain embodiments, one or more of energy absorbing element(s) 130 may be an electromagnetic impact absorber or damper.

Figure 4B:
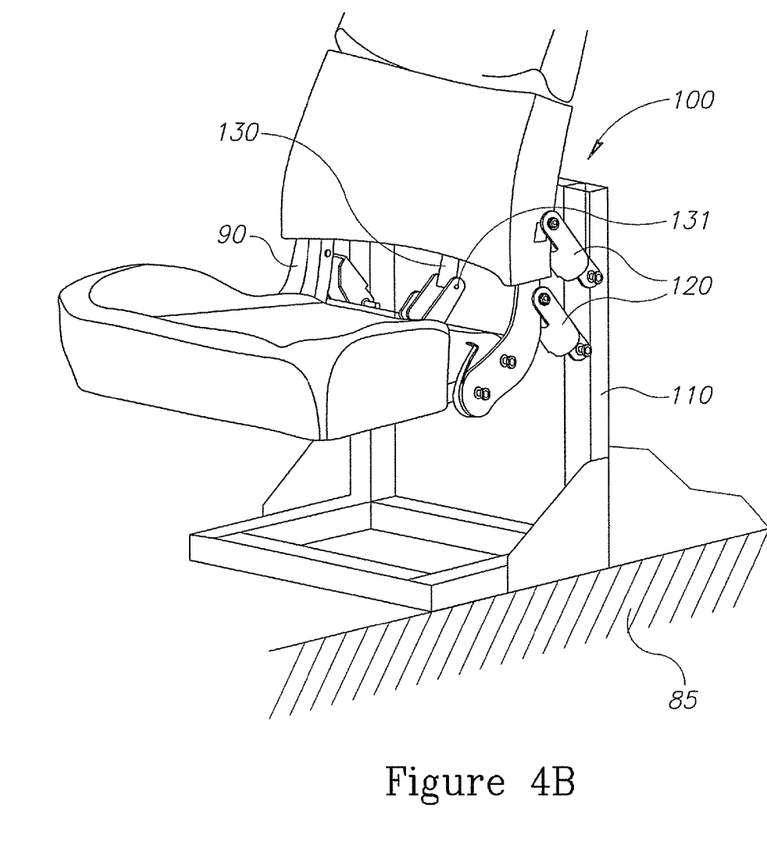
FIG. 4B is a high level schematic illustration of the device having a vertical support connected to a vehicle's floor, according to some embodiments of the invention.

FIG. 4B is a high level schematic illustration of device 100 having vertical support 110 connected to a vehicle's floor 85, according to some embodiments of the invention. In certain embodiments, vertical support 110 may be connected to vehicle's wall 80 or to a vehicle's floor 85, e.g., via elaborate support 110 as illustrated in FIG. 4B.

Figure 5A:
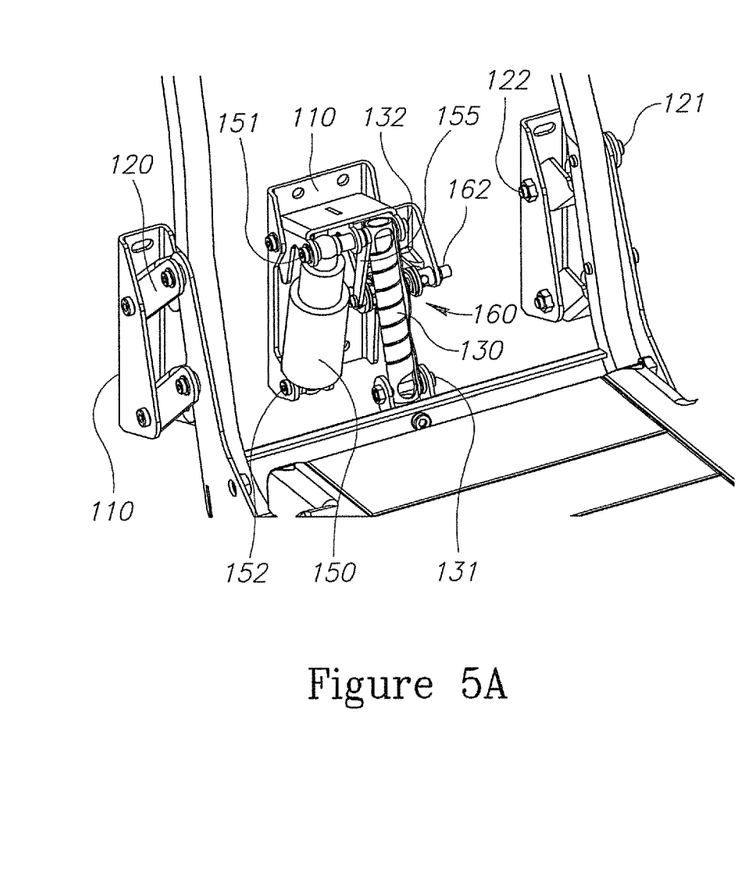
FIGS. 5A and 5B are high level schematic illustrations of an adaptable device, according to some embodiments of the invention.
Figure 5B:
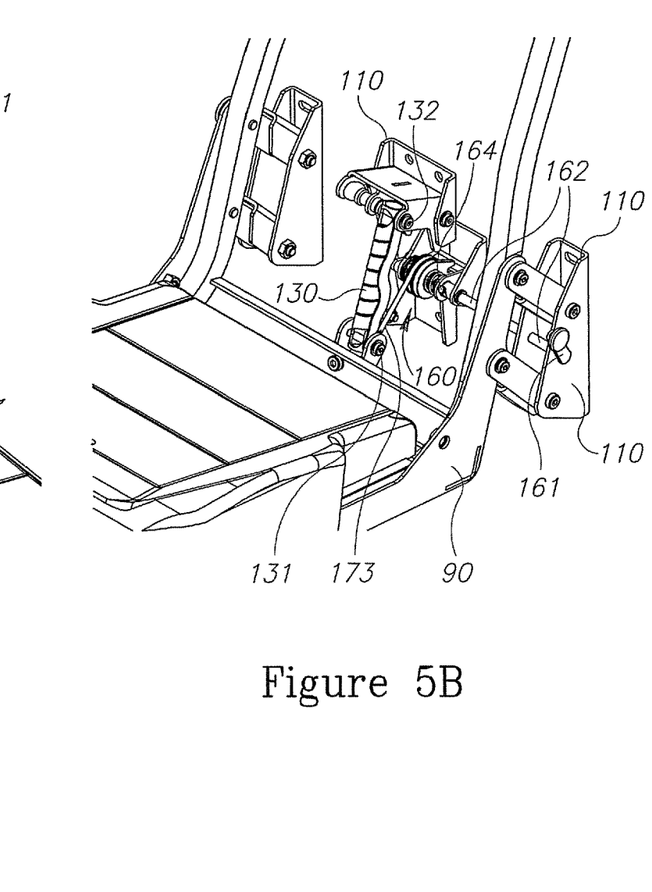

FIGS. 5A and 5B are high level schematic illustrations of adaptable device 100, according to some embodiments of the invention. FIG. 5A schematically illustrates a mechanical adjustment mechanism comprising piston 150 connected serially to energy absorbing element 130, at pivots 151, 152 and configured to react to user parameters such as user weight, when seated on seat 90 (piston 150 may be a slow reacting piston that doesn't change its position much under a regular range of accelerations associated with vehicle movements). Mechanical elements, such as rod 155, are configured to rotate axis 162 according to the extent to which piston 150 contracts. Rod 162 holds a force adjustment contraption 160 (also termed adaptable energy absorption contraption 160) which is configured to tune the relative motion of seat 90 to support 110 under varying user parameters (or preferences) under given specifications of energy absorbing element 130 (e.g., dimensions, deformation, absorbed energy). Contraption 160 may be configured to provide additional energy absorption capacity, e.g., via a link such as cable 173 or any other type of mechanical link, in a way that provides similar relative motions of seat 90 with respect to support 110 under different user weights, for example, by increasing the applied force as user weight increases. FIG. 5B schematically illustrates a manually adjustable mechanism, in which the extent of additional energy absorption capacity and the force applied via cable 173 are manually adjustable by rotating handle 161.

Adaptable energy absorption contraption 160 may be connected in series to energy absorbing element(s) 130 or may be integrated as one of energy absorbing element(s) 130. Contraption 160 is configured to change energy absorption parameters according to user preferences and/or user parameters. For example, a weight sensing mechanical element (illustrated, in a non-limiting manner by piston 150 or handle 161) may be configured to adapt contraption 160 to user parameters.

Figure 6A:
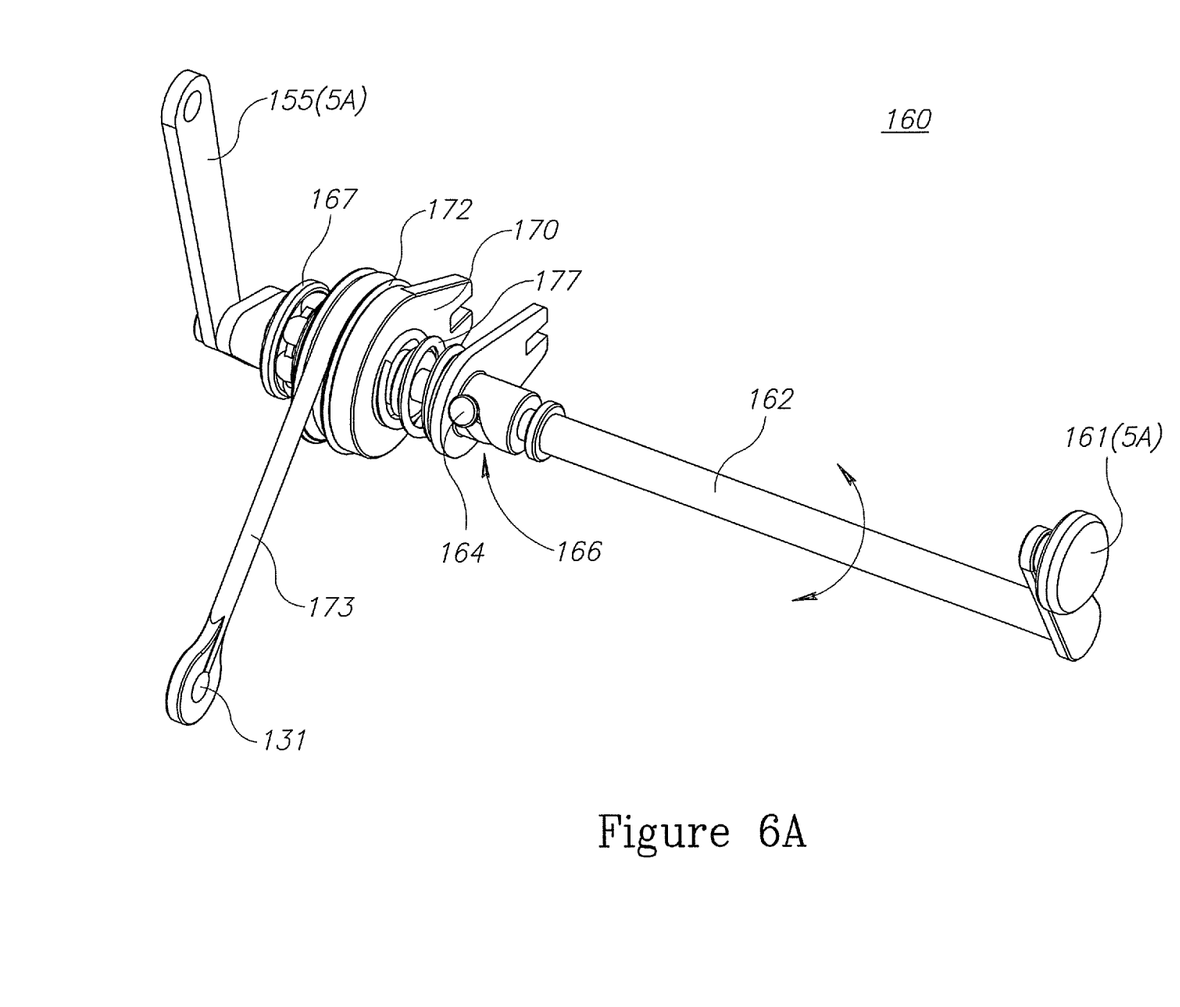
FIGS. 6A-6C are high level schematic illustrations of a force adjustment contraption, according to some embodiments of the invention.
Figure 6B:
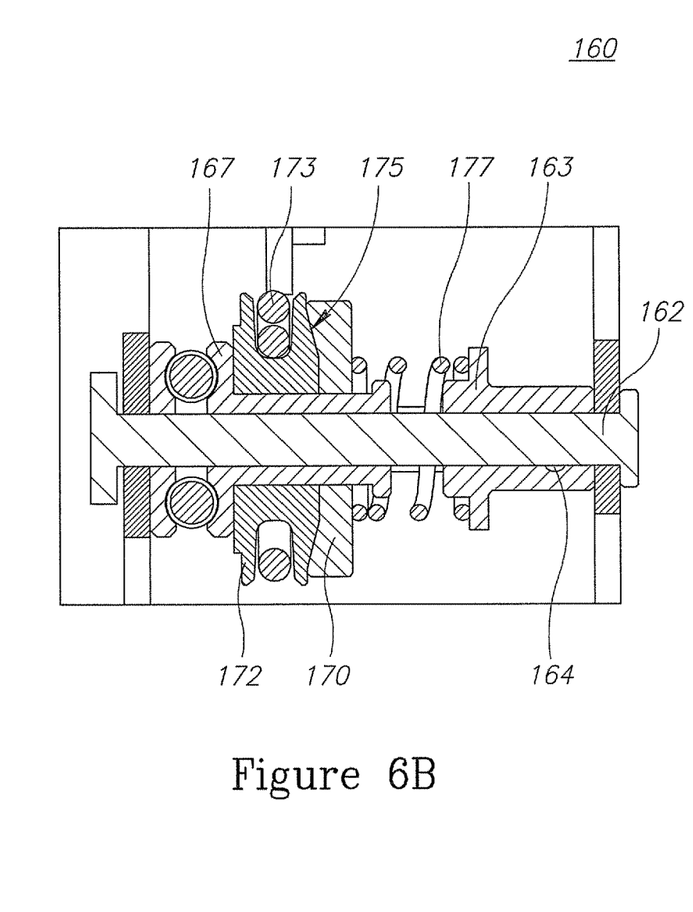
Figure 6C:
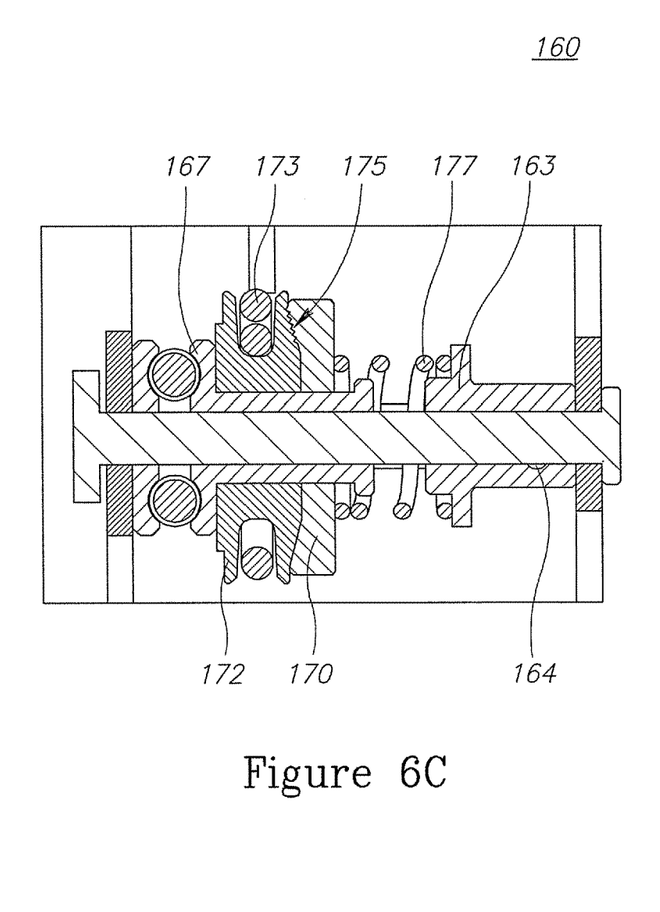

FIGS. 6A-6C are high level schematic illustrations of force adjustment contraption 160, according to some embodiments of the invention. FIG. 6A is a perspective view, illustrating two alternative or complementary control elements, namely rod 155 (from the automatically adjustable configuration illustrated in FIG. 5A) and handle 161 (from the manually adjustable configuration illustrated in FIG. 5B). These control elements are basically alternatives, but may also be combined to provide both automatic adjustment and manual override possibilities. FIGS. 6B and 6C schematically illustrate cross section views of contraption 160.

Both controls 155, 161 are configured to determine the angular position of rod 162. Rotating rod 162 (may be supported by bearing 167 to reduce friction) is used to control energy absorption by contraption 160, as delivered by cable 173 or by any other mechanical force transfer elements (rod rotation may possibly also be transformed into different tensions or lengths of cable 173). In certain embodiments, rod rotation may be delivered via the illustrated mechanism of protrusion 164 moving through groove 166 and determining thereby the length of spring 177 bound between plates 163, 170, and thereby also the force applied by plate 170 onto cable support 172. Stronger forces applied to interface 175 between plate 170 and cable holder 172 provide larger energy absorption by contraption 160. It is noted that the details of the illustrated force transfer mechanism are not limiting. For example, protrusion 164 and groove 166 may be replaced by other, linear or non-linear mechanisms for transforming rod rotation to spring compression. It is also noted that the details of the illustrated adaptable energy absorption mechanism, namely spring 177 and plates 163, 170, are non-limiting. For example, spring 177 may be replaced by Belleville springs, gas springs, or any other means implementing variable force.

Energy absorption parameters may be adapted according to user preferences and/or parameters. For example, an additional damper may be installed, that is configured according to the user, such as contraption 160 in association with piston 150 and rod 155 or with handle 161. The damper may be configured according to user parameters, automatically or manually, for example by using a weight sensing mechanical element (e.g., piston 150 and rod 155) to adjust the additional damper (e.g., contraption 160 part) according to user parameters.

Figure 7:
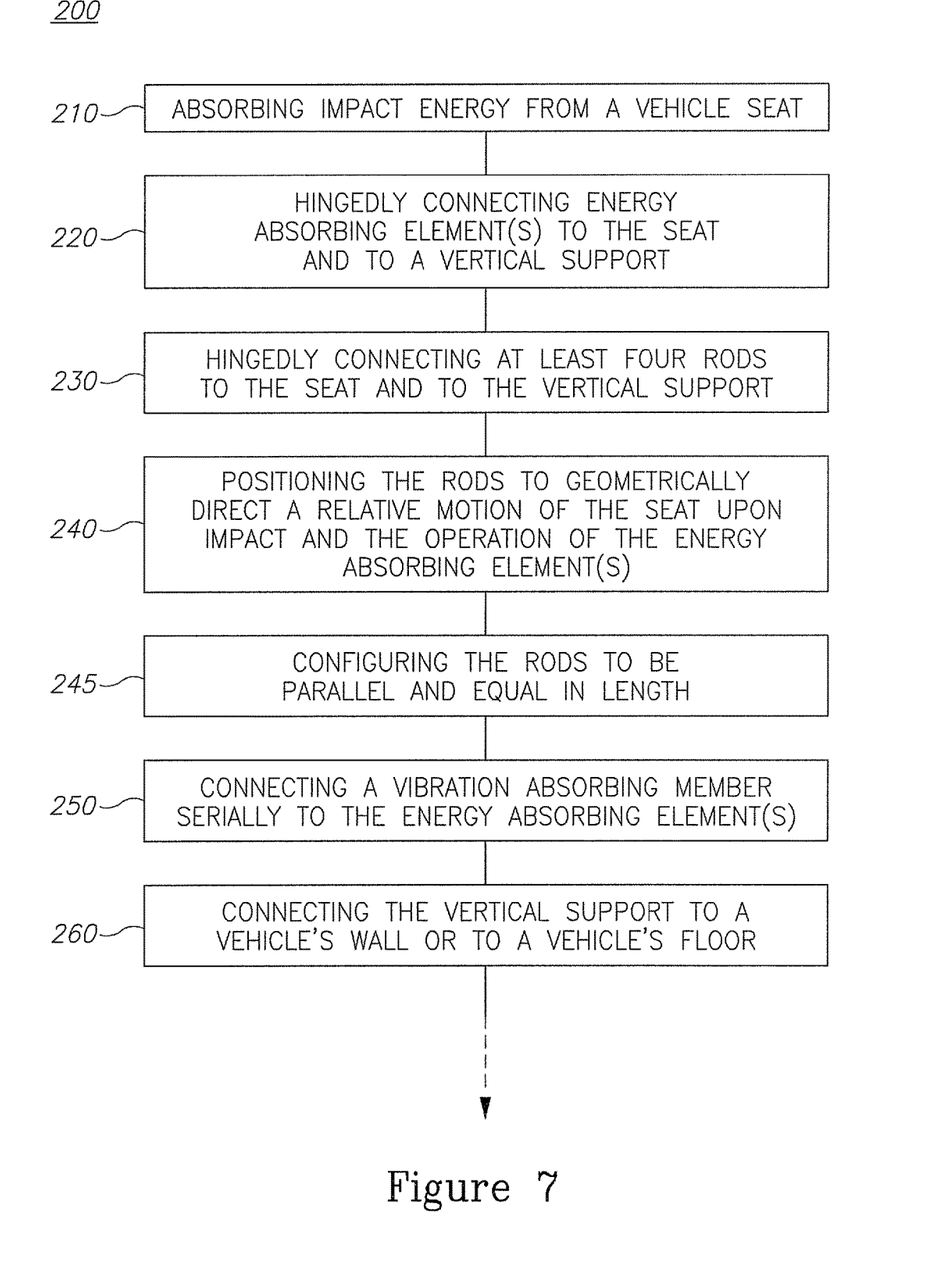
FIG. 7 is a high level schematic illustration of a method of impact absorption for a vehicle's seat, according to some embodiments of the invention.

FIG. 7 is a high level schematic illustration of a method 200 of impact absorption for a vehicle's seat, according to some embodiments of the invention. Method 200 comprises absorbing impact energy from a vehicle's seat 210 according to given specification of spatial and energetic constraints.

Method 200 may comprise any of the following stages: hingedly connecting at least one energy absorbing element to the seat and to a vertical support (stage 220), hingedly connecting at least four rods to the seat and to the vertical support (stage 230), and positioning the rods to geometrically guide a relative motion of the seat with respect to the vertical support upon impact, and to direct the impact energy absorption by the at least one energy absorbing element (stage 240).

Method 200 may further comprise configuring the rods to be parallel and equal in length (stage 245). Method 200 may further comprise connecting a vibration absorbing member serially to the energy absorbing element(s) (stage 250).

Method 200 may further comprise connecting the vertical support to a vehicle's wall or to a vehicle's floor (stage 260) and/or positioning the rods to enable the relative motion of the seat upon impact and the energy absorption for at least one of: vertical, rear and front impacts (stage 270).

In certain embodiments, method 200 may further comprise adapting energy absorption parameters according to user preferences and/or parameters (stage 280). For example, method 200 may comprise installing an additional damper that is configured according to the user (stage 285) and may further comprise configuring the damper according to user parameters, automatically or manually (stage 290), for example by using a weight sensing mechanical element to adjust the additional damper according to user parameters (stage 295).

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. An impact absorption device for a vehicle's seat, comprising:
    a vertical support;
    at least one spirally wound energy absorbing element produced by introducing a cut of a specified width into a manufactured tubular element, configured to absorb impact energy by plastic elongation or compression, hingedly connectable to the seat and hingedly connected to the vertical support; and
    at least four rods hingedly connectable to the seat and hingedly connected to the vertical support, the rods positioned to geometrically guide a relative motion of the seat, when connected thereto, with respect to the vertical support upon impact, and to direct the impact energy absorption by the at least one energy absorbing element.

2. The impact absorption device of claim 1, wherein the vertical support is connected to a vehicle's wall or to a vehicle's floor.

3. The impact absorption device of claim 1, wherein the rods are parallel and are equal in length.

4. The impact absorption device of claim 1, wherein the rods are positioned to enable the relative motion of the seat upon impact and the energy absorption for at least one of: vertical, rear and front impacts.

5. The impact absorption device of claim 1, further comprising a contraption connected in series to the at least one energy absorbing element and configured to change energy absorption parameters according to at least one user preference or parameter.

6. The impact absorption device of claim 5, further comprising a weight sensing mechanical element configured to adapt the contraption to user parameters.

7. An impact handling system comprising a dynamic part mounted on a static part via at least four rods and at least one energy absorbing element which are positioned and configured to guide, upon specified impacts, a motion of the dynamic part and an energy absorption by the at least one energy absorbing element.

8. The impact handling system of claim 7, wherein the dynamic part is a seat and the static part is a vehicle part.

9. The impact handling system of claim 7, wherein the specified impacts comprise at least one of: vertical, rear and front impacts.

10. A method of impact absorption for a vehicle's seat, comprising:
hingedly connecting at least one energy absorbing element to the seat and to a vertical support, wherein the at least one energy absorbing element is a spirally wound element produced by introducing a cut of a specified width into a manufactured tubular element and is configured to absorb impact energy by plastic elongation or compression,
hingedly connecting at least four rods to the seat and to the vertical support, and
positioning the rods to geometrically guide a relative motion of the seat with respect to the vertical support upon impact, and to direct the impact energy absorption by the at least one energy absorbing element.

11. The method of claim 10, further comprising configuring the rods to be parallel and equal in length.

12. The method of claim 10, further comprising connecting the vertical support to a vehicle's wall or to a vehicle's floor.

13. The method of claim 10, further comprising positioning the rods to enable the relative motion of the seat upon impact and the energy absorption for at least one of: vertical, rear and front impacts.

14. The method of claim 10, further comprising adapting energy absorption parameters according to at least one user preference or parameter.

15. The method of claim 14, further comprising installing an additional damper that is configured according to the user and using a weight sensing mechanical element to adjust the additional damper according to user parameters.

* * * * *